United States Patent [19]

Martin

[11] 4,339,258
[45] Jul. 13, 1982

[54] METHOD FOR BLOW MOLDING AND COOLING HOLLOW GLASSWARE

[75] Inventor: John K. Martin, Monterrey, Mexico

[73] Assignee: Vitro Tec Fideicomiso, Monterrey, Mexico

[21] Appl. No.: 107,850

[22] Filed: Dec. 28, 1979

Related U.S. Application Data

[62] Division of Ser. No. 898,080, Apr. 20, 1978, Pat. No. 4,200,449.

[51] Int. Cl.³ ............................................. C03B 9/193
[52] U.S. Cl. ....................................................... 65/79
[58] Field of Search ................ 65/231, 240, 241, 261, 65/264, 266, 300, 79, 80, 229, 262

[56] References Cited

U.S. PATENT DOCUMENTS

| | | | |
|---|---|---|---|
| 1,979,211 | 10/1934 | Rowe | 65/229 |
| 2,123,145 | 7/1938 | Peiler | 65/262 |
| 3,125,429 | 3/1964 | Lauck et al. | 65/262 X |
| 3,652,253 | 3/1972 | Small | 65/262 X |

*Primary Examiner*—Richard V. Fisher
*Attorney, Agent, or Firm*—Kemon & Estabrook

[57] ABSTRACT

A method of blow molding hollow ware in a paste mold machine includes positioning a blow nozzle in spaced non-sealed relation to the neck ring. During the blowing portion of the molding cycle, air is continuously flowed into and out of the ware so as to simultaneously cool and shape the ware.

1 Claim, 35 Drawing Figures

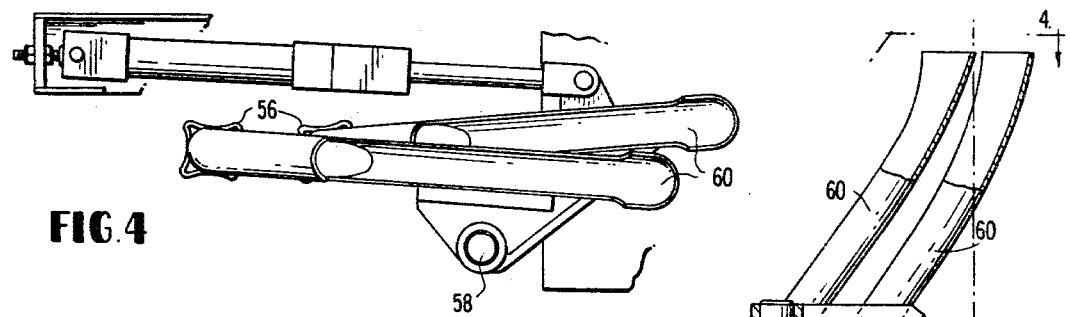
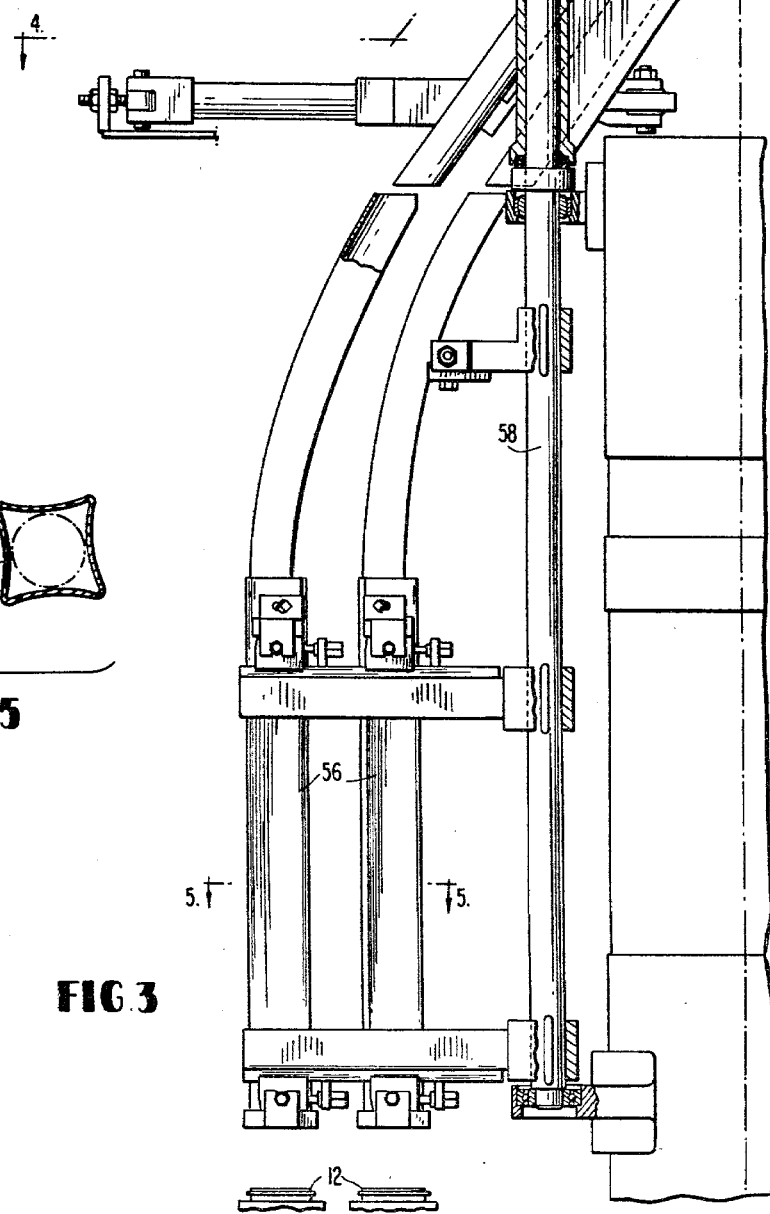

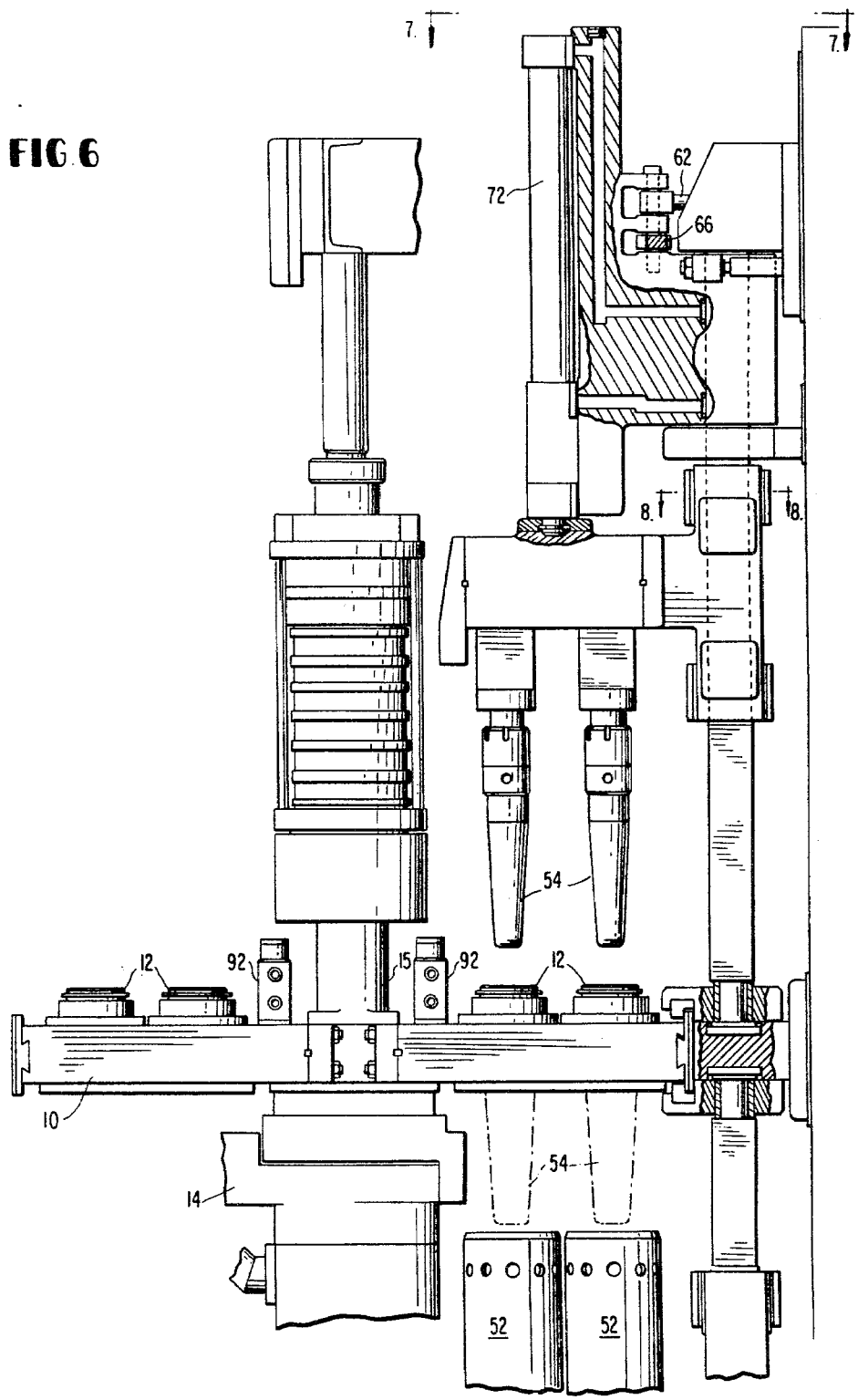

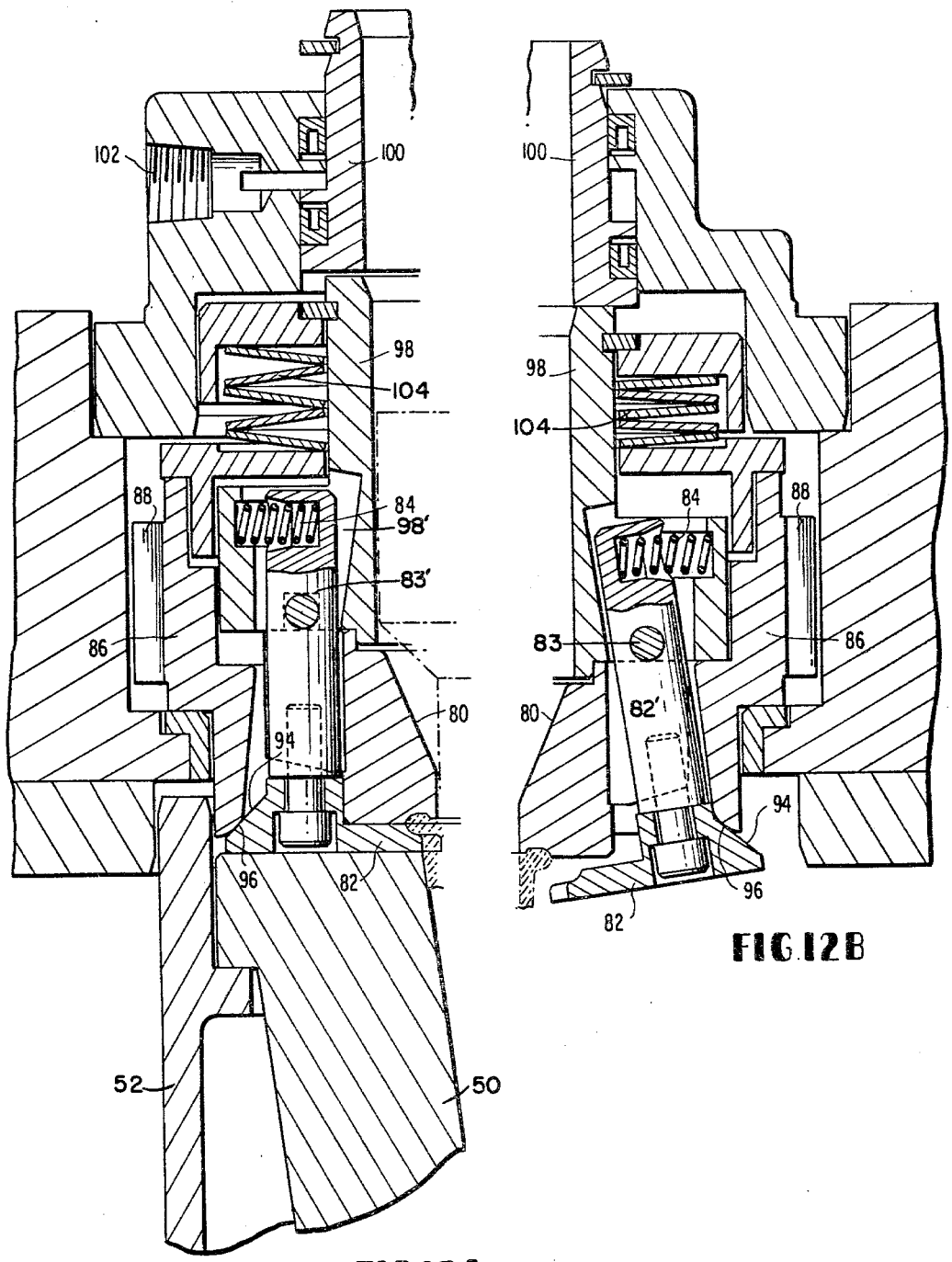

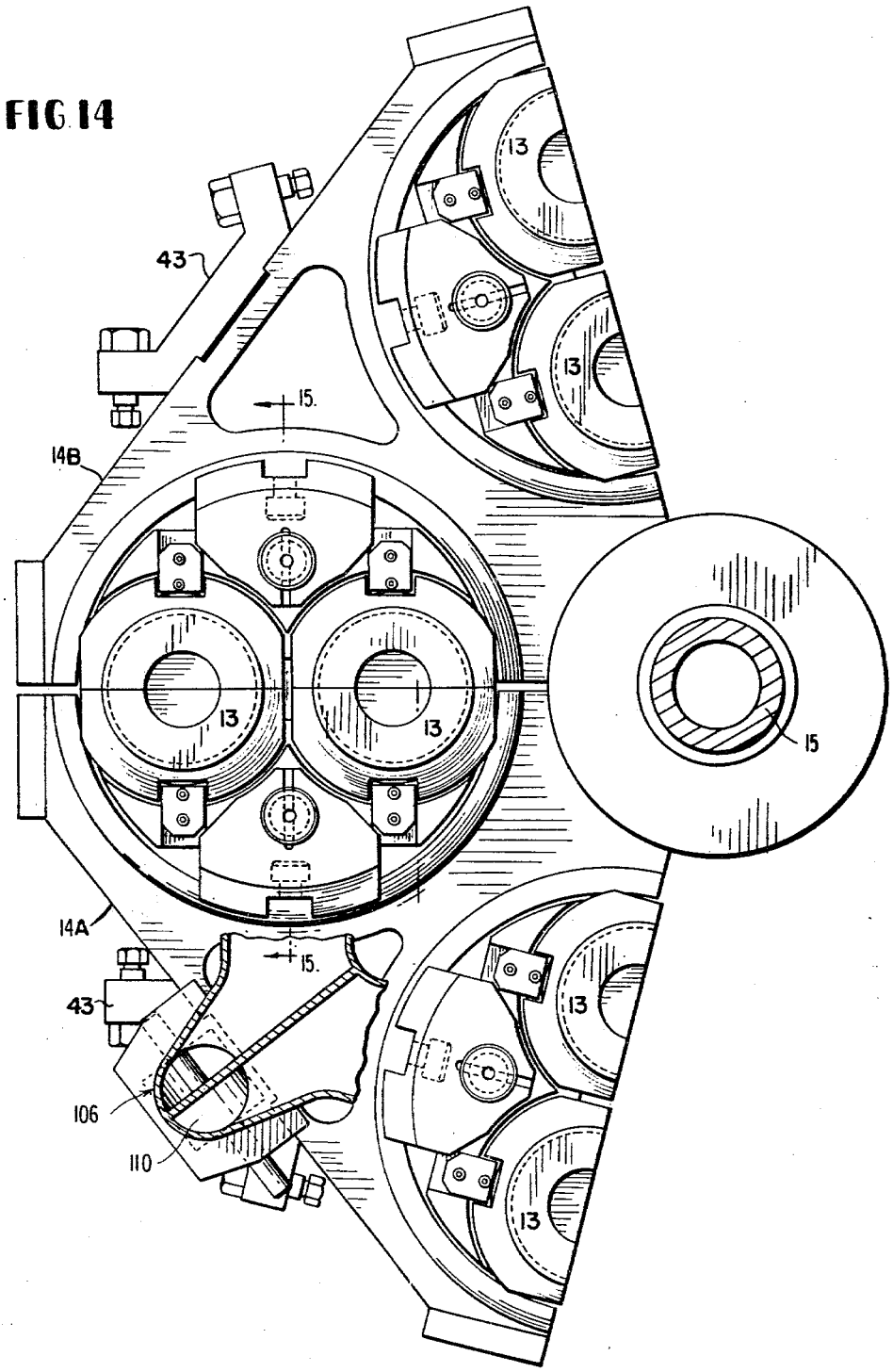

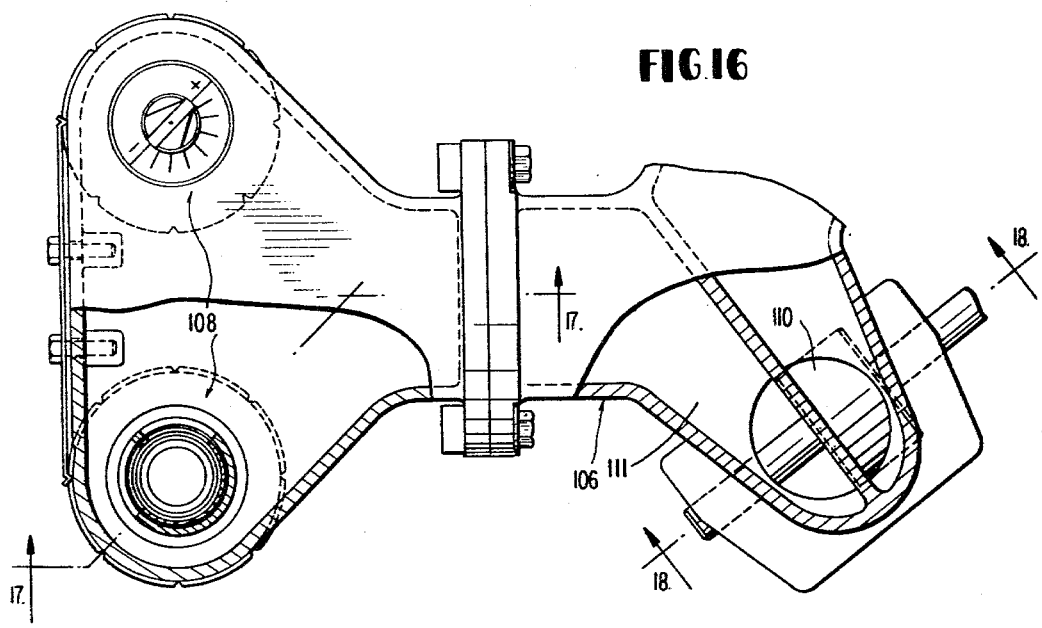
FIG.16
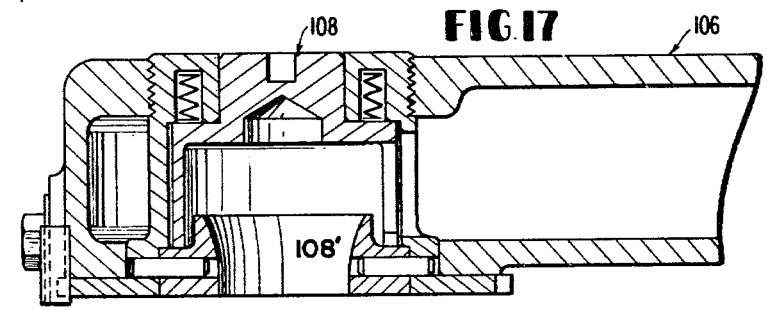
FIG.17
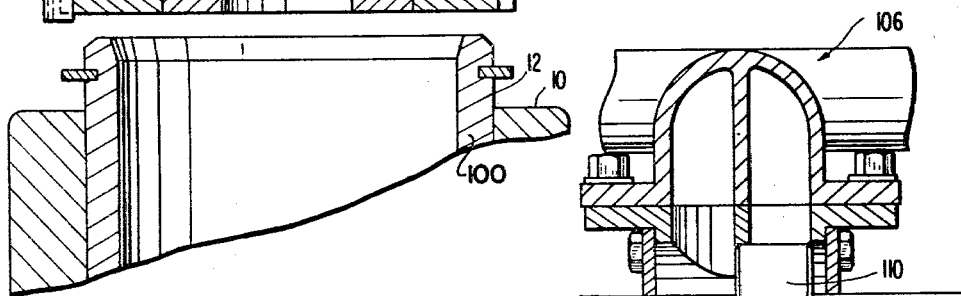
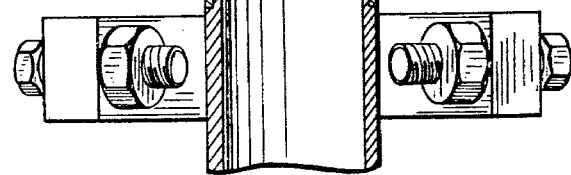
FIG.18

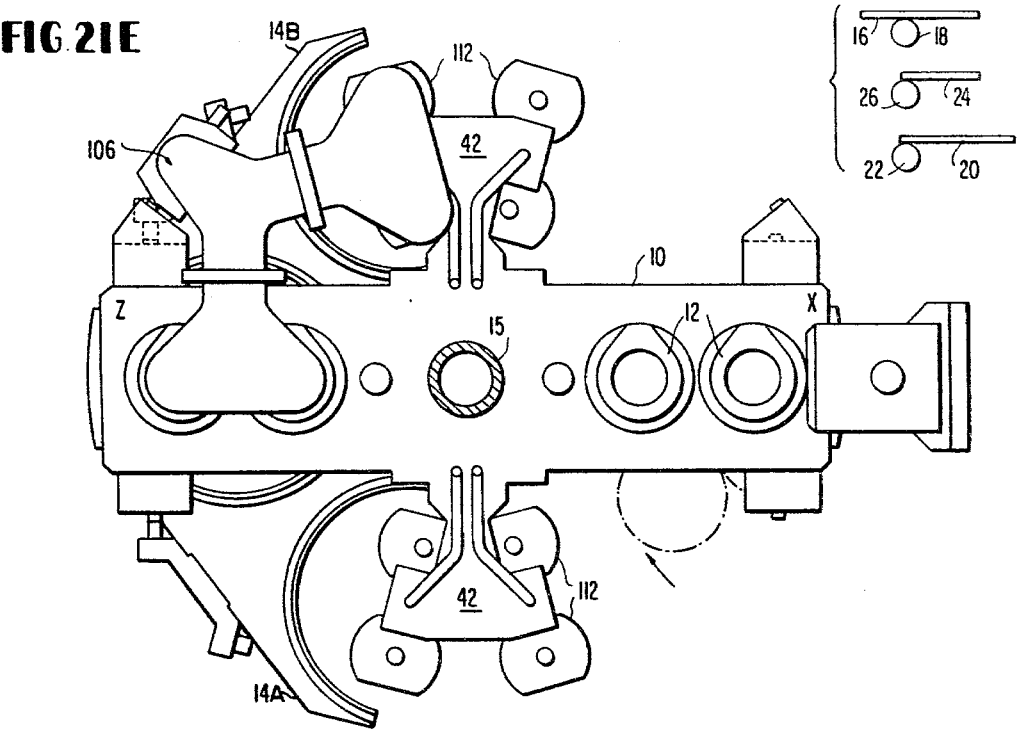
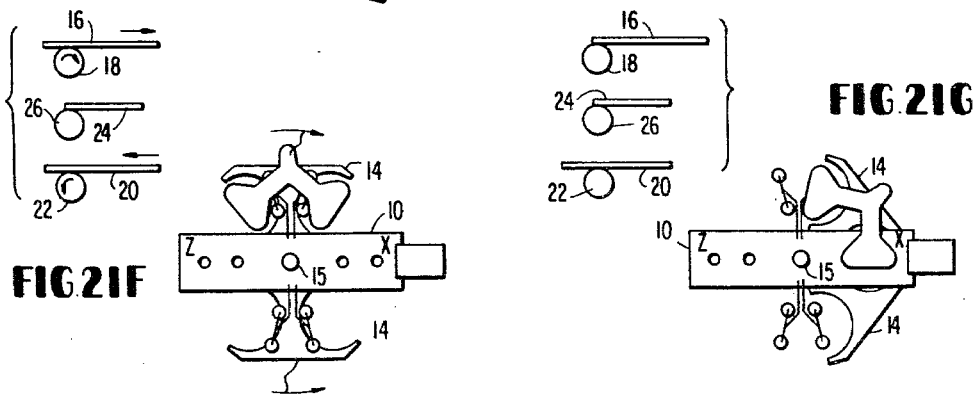
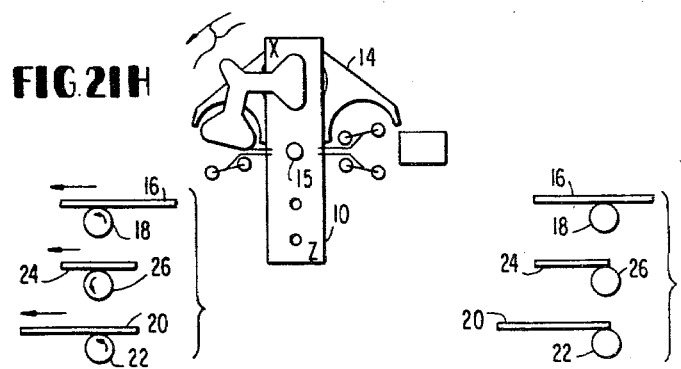
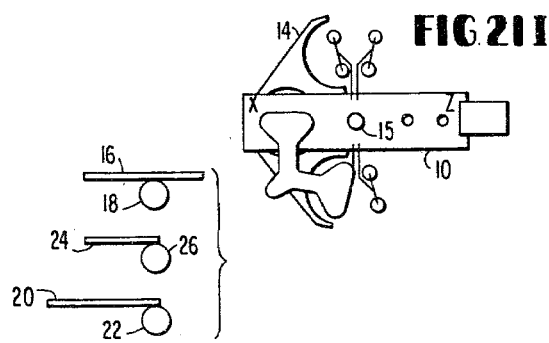

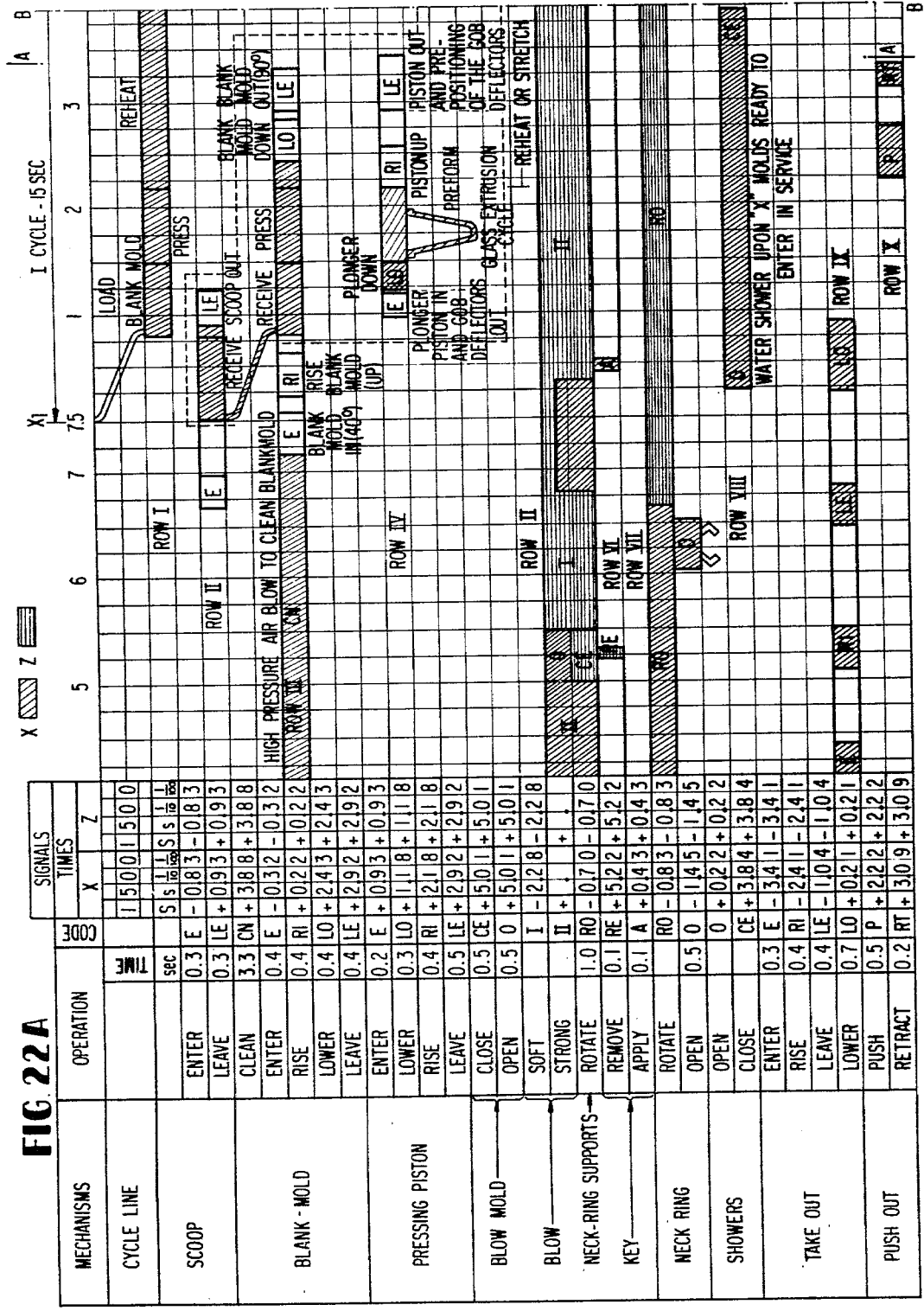

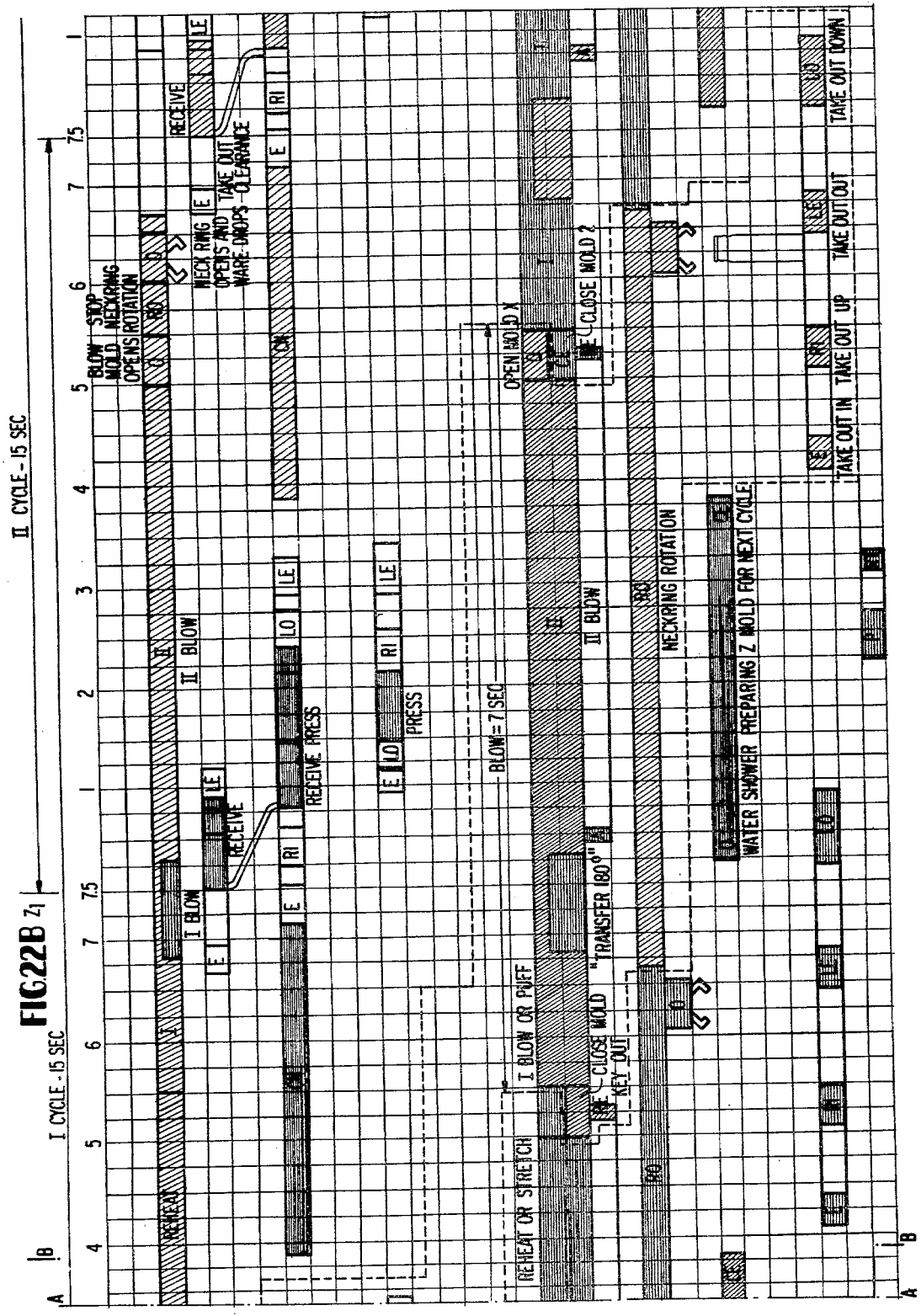

METHOD FOR BLOW MOLDING AND COOLING HOLLOW GLASSWARE

This is a division of application Ser. No. 898,080, filed Apr. 20, 1978, now U.S. Pat. No. 4,200,449.

BACKGROUND OF THE INVENTION

There is a subsTantial prior patent art on so-called paste mold machines where a parison mold and associated plunger are used to make a preform supported by a rotatable neck ring and then a blow mold is positioned around the preform which is then blown to finished form in the blow mold. Examples may be found in the following U.S. Pat. Nos.:

| Canfield | 1,878,465 | 1932 |
| Rowe | 1,979,211 | 1934 |
| Rowe | 2,645,059 | 1953 |
| Bartlett | 2,849,838 | 1958 |
| Martin | 3,142,552 | 1964 |

The present invention relates to machines of this general type and constitutes substantial improvements thereover in efficiency, increased production rate, and compactness improved quality of the finished glassware.

BRIEF SUMMARY OF THE INVENTION

In accordance with the present invention, a stationary multiple-section machine is provided with each section identical and supported from a common base having a central vertical column. Each section includes a neck ring arm freely rotatably mounted at its center for oscillation in a horizontal plane about its center between two lockable positions, 180° apart and having at least one rotatable neck ring carried by said arm on each side of its center. In one of said lockable positions, one side of said neck ring arm is in a molding position and the other end of said arm is in a takeout position. There is at least one parison mold suitably mounted below the neck ring arm for elevation and translation into and out of engagement with a neck ring in the molding position. There is a molten glass feeding means for delivering gobs of glass to the parison mold substantially at the moment of engagement with a neck ring and forming plungers for forming a preform supported by the neck ring, all operating in timed relation to the oscillation of the neck ring arm. The blow molds are mounted below and interconnected with the neck ring arm for oscillation on the same axis therewith and the number of blow molds is equal to the number of neck rings. The blow molds on opposite sides of the center of oscillation are interconnected so that when the ones on one side of the axis of oscillation are closed, the others are open. The open molds are spray cooled both during and after oscillation of the neck ring arm to prepare them for the next preform.

BRIEF DESCRIPTION OF THE DRAWINGS

FIG. 3, taken in the direction of the arrows 3—3 of FIG. 1 is a side elevation partially in section of the molten glass feeder chutes for one section of the machine;

FIG. 4 is a view on the lines 4—4 of FIG. 3;

FIG. 5 is a section on the lines 5—5 of FIG. 3;

FIG. 6 is a side elevation partially in section and taken generally on the lines 6—6 of FIG. 1;

FIGS. 12A and 12B are side elevations in section showing the closed and open positions of the neck rings respectively;

FIG. 14 is a top plan view of the blow mold support means with one pair of blow molds closed and the other pair open;

FIG. 16 is a top view partially in section of the blowing nozzles for the blow molds;

FIG. 17 is a section on the line 17—17 of FIG. 16;

FIG. 18 is a sectional view on the line 18—18 of FIG. 16;

FIGS. 21A through 21I are successive views of the neck ring arm and blow molds in a complete molding sequence keyed to the positions of the rack and pinion members shown in detail in FIG. 13; and FIGS. 22A and 22B are diagrams of the molding cycle of the machine for the molding of two successive articles or pairs of articles.

DETAILED DESCRIPTION OF DRAWINGS

A. The Neck Ring Arm, Blow Mold Support, And Drive Mechanism

Figure 21A:
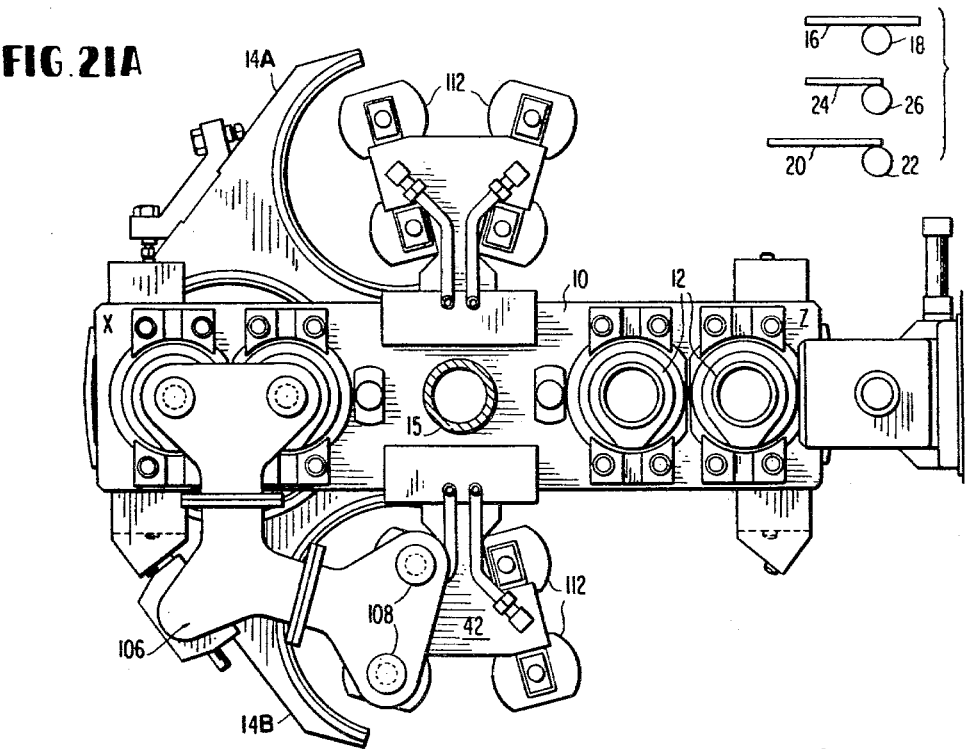
Figure 21B:
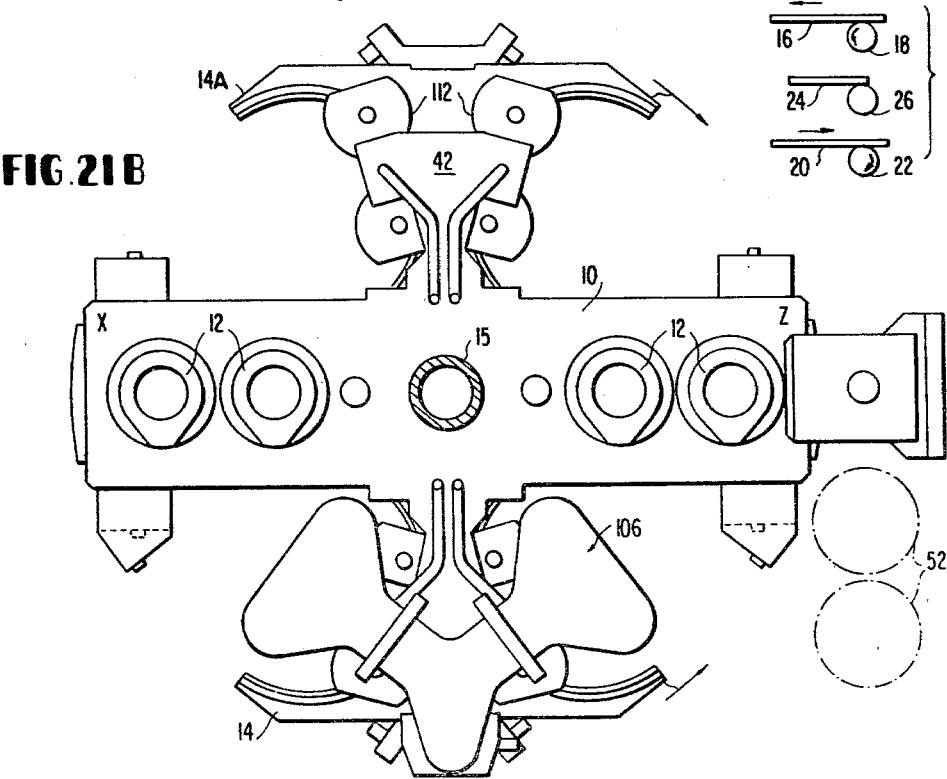

The basic operation of the machine will be best understood by considering first the cooperating movement of the blow molds and the neck ring arm. As illustrated in FIGS. 13, 13A and 21A-21I, a neck ring arm 10 is mounted for oscillation in a horizontal plane about a vertical axis which extends through the center of the arm and the arm carries a plurality of rotatable neck rings 12 (4 in all) symmetrically disposed on either side of the center of oscillation of the neck ring arm about vertical shaft 15 as shown, for example, in FIGS. 6 and 11. Positioned below the neck ring arm and oscillatable on the same axis therewith is an articulated two part mold carrier 14 for supporting a plurality of two-piece blow molds. The mold carrier 14 as shown in FIG. 21A is positioned so that the blow molds on the left-hand side of this figure are closed around ware supported by the neck rings also on the left-hand side of this figure. The opposite set of blow molds are open when the parts are in the position shown in the FIG. 21C. Referring next to FIGS. 21A–21I, it will be seen that with the neck ring arm 10 stationary, during the preforming and initial blowing that the mold carrier 14 can be moved from the position shown in FIG. 21A to the position shown in FIG. 21C in which the opposite set of blow molds 13 are closed and those shown closed in FIG. 21A are now open. FIG. 21B shows a transition position with both sets of blow molds open. Also, in a manner to be described hereinafter, the blow mold carrier 14 and the neck ring arm 10 are oscillatable together about the axis of the shaft 15 between two locked positions 180° apart. Movements of the neck ring 14 and the mold carrier arm are controlled by a rack and pinion arrangement best shown in FIGS. 13 and 13A. Referring now to those Figures, it will be seen that there are three parallel rack and pinion arrangements, with all three pinions mounted for rotation concentrically around a vertical shaft 15. The upper rack 16 and pinion 18 are mechanically connected to one half 14A of the mold carrier 14 through a hollow drive sleeve 19. Likewise, the lower rack 20 and lower pinion 22 are directly connected to and control the movements of the other half 14B of the mold carrier 14 through a hollow tube 23. The middle rack 24 and middle pinion 26 are interconnected with the upper and lower rack and pinion assemblies. As shown in these Figures, the upper pinion 18 has an upper integral bevel gear 32 and the lower pinion 22 has a lower integral bevel gear 34. The middle pinion 26 carries a plurality of intermediate bevel gears 36 mounted on stub shafts 38 and the intermediate bevel gears 36 each mesh with the upper and lower bevel gears 32 and 34 of the upper and lower pinions 18 and 22. For purposes of clarity, the neck ring arm 10 shown in FIG. 13A has openings for only two neck rings and the blow mold carrier 14, accordingly, is shown as capable of carrying only two blow molds.

Figure 21C:
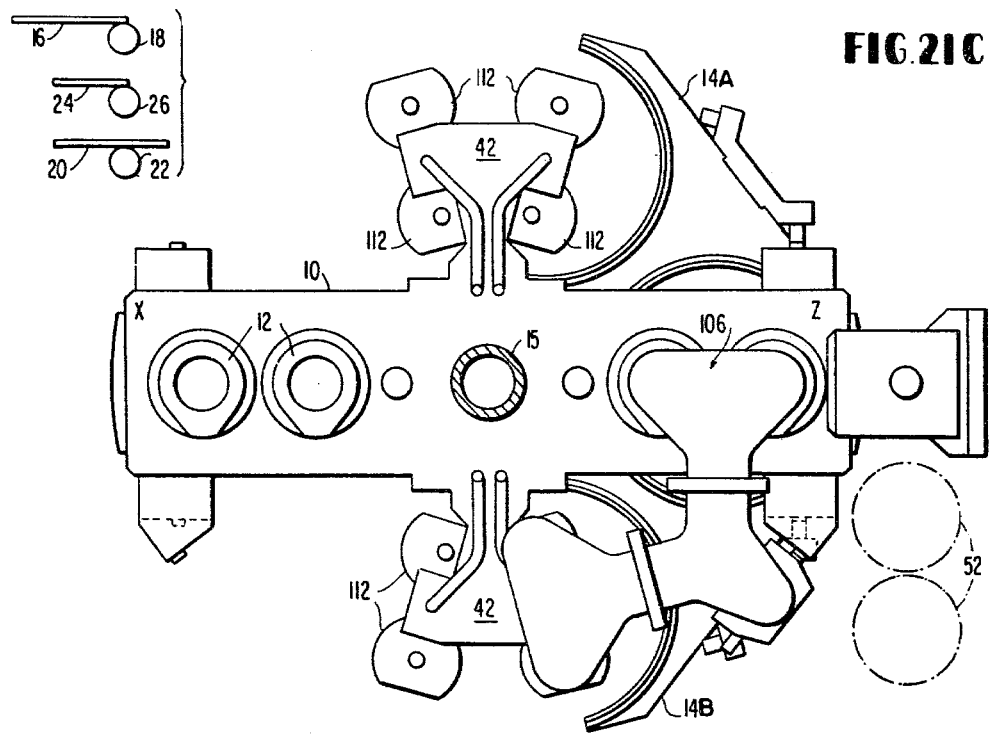
Figure 21D:
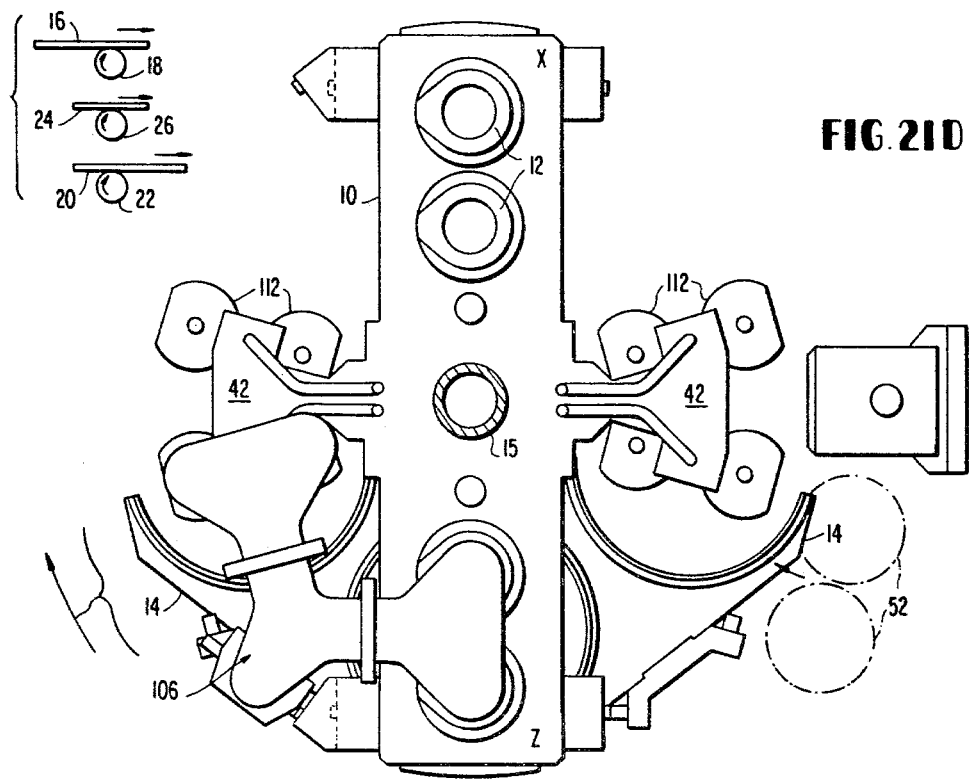

During operation of the machine, the neck ring arm 10 is oscillated alternately between two positions 180° apart and when occupying either of these two positions, it is mechanically locked in place by means of a hydraulically operated key 39 which is biased into locked position by spring 41 when hydraulic force is removed. When in either of its two locked positions, one of the two sets of rotatable neck rings are aligned with a set of parison molds, the operation of which will be described hereinafter. The neck ring arm 10, when unlocked is freely rotatable on the shaft 15, and is driven between its two positions by the extended jacks 43 carried by the blow mold support members 14A and 14B as shown most clearly in FIG. 13A. At this point of the description, it is enough to understand with reference to FIGS. 21A to 21I, inclusive, that in FIG. 21A, the neck ring arm is locked into one of its two positions and the blow mold carrier 14 occupies a position in which one set of blow molds is closed around a set of preforms carried by the neck rings at the left-hand side of the Figure. Let us further assume that the blow molding operation in the closed molds is complete and the machine is at the point in an operating cycle where the completed ware is about to be released to a take out means and blow molding of another set of preforms is about to begin. In each of FIGS. 21A to 21I, inclusive, the position of the blow mold carriers 14 and the neck ring arm 10 is keyed to the relative position of the three rack and pinion assemblies as shown diagrammatically by the small inset in each Figure. Between FIGS. 21A and 21C, the neck ring arm 10 is stationary and the blow mold carrier 14 first opens the blow molds at the left-hand side of the neck ring arm and then closes the blow molds around preforms carried by the neck rings at the opposite end of the neck ring arm. The intermediate position of mold carrier 14 is shown in FIG. 21B, and its new position in FIG. 21C. Also as shown in these Figures the blowing head 106 having two sets of blowing nozzles 108 is supported by the mold carrier 14. As soon as the blow molding of the articles on the right-hand side of the neck ring arm as shown in FIG. 21C is substantially complete, and the entire assembly, that is the neck ring arm and the blow mold carrier, begins to rotate in a clockwise direction, as indicated in FIG. 21D. In FIG. 21E, rotation of the entire assembly is complete and the neck ring is now locked in a position 180° away from the position of FIG. 21A. During the rotation of the assembly from the position shown in FIG. 21C to that shown in FIG. 21E, the blowing is continued in order to cool the formed ware and at the same time spray heads 42 are actuated to cool and moisten the opened blow molds preparatory to their being closed around new preforms.

FIGS. 21F to 21I inclusive are used similar to FIGS. 21A to 21E to illustrate, again diagrammatically keyed to the relative position of the rack and pinion assemblies, the reverse rotation of the neck ring arm and mold assemblies to return all parts to the position of FIG. 21A and thus complete a whole cycle of oscillation. The foregoing sequence of steps as illustrated in these Figures is then repeated on a continuous basis during operation of the machine.

From the foregoing, it will be apparent to those skilled in this art that the molding cycle in accordance with the present invention is both efficient and compact. When preforms are being pressed in parison molds at one end of the neck ring arm, the preforms at the other end of the neck ring arm are being finished in the closed blow molds.

B. Parison Molds and Preforming of Ware

Referring now to FIGS. 2–10 inclusive, FIG. 6 shows the neck ring arm 10 locked in the position of either of FIGS. 21A or 21E. Also shown in FIG. 6 are parison mold holders 52 aligned with the neck rings and a set of plungers 54 above the neck ring arm and also aligned concentrically with both the neck rings and the parison molds 50. The parison molds, the parison mold holders, and the plungers must be mounted not only for movement in a vertical plane, but they must also be swung into and out of concentric position below and above the neck rings in order to permit the feeding of molten glass to the parison molds through the neck rings and also to permit the blow molds to close around the preforms.

The chutes 56 which feed the gobs of molten glass into the parison molds are best shown in FIGS. 3, 4, and 5, and are mounted for pivotal movement around a vertical axis on the shaft 58. Gobs of molten glass from a feeder (not shown) are directed towards the chutes 56 from another pair of chutes 60 shown in FIG. 3. There is a pair of the chutes 56 and 60 for each section of the machine.

Figure 7A:
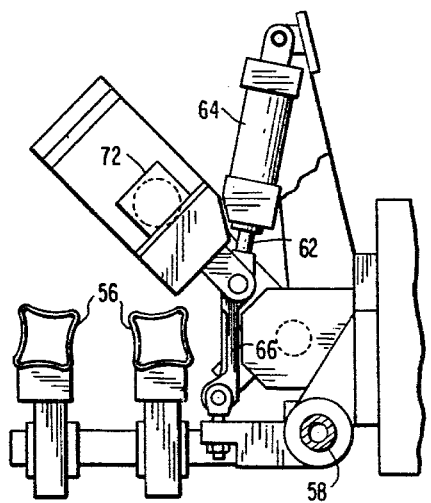
FIGS. 7A and 7B are views on the line 7—7 of FIG. 6, showing the feeder chutes in operative and inoperative positions.
Figure 7B:
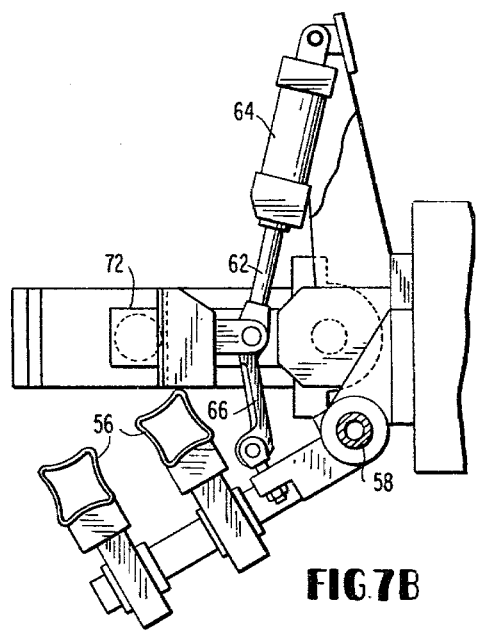
Figure 8:
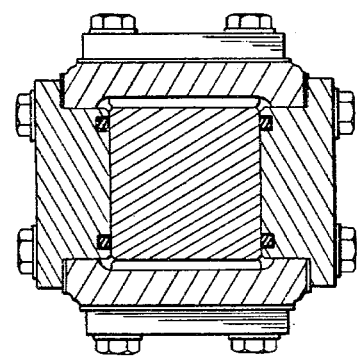
FIG. 8 is a section on the line 8—8 of FIG. 6.
Figure 9:
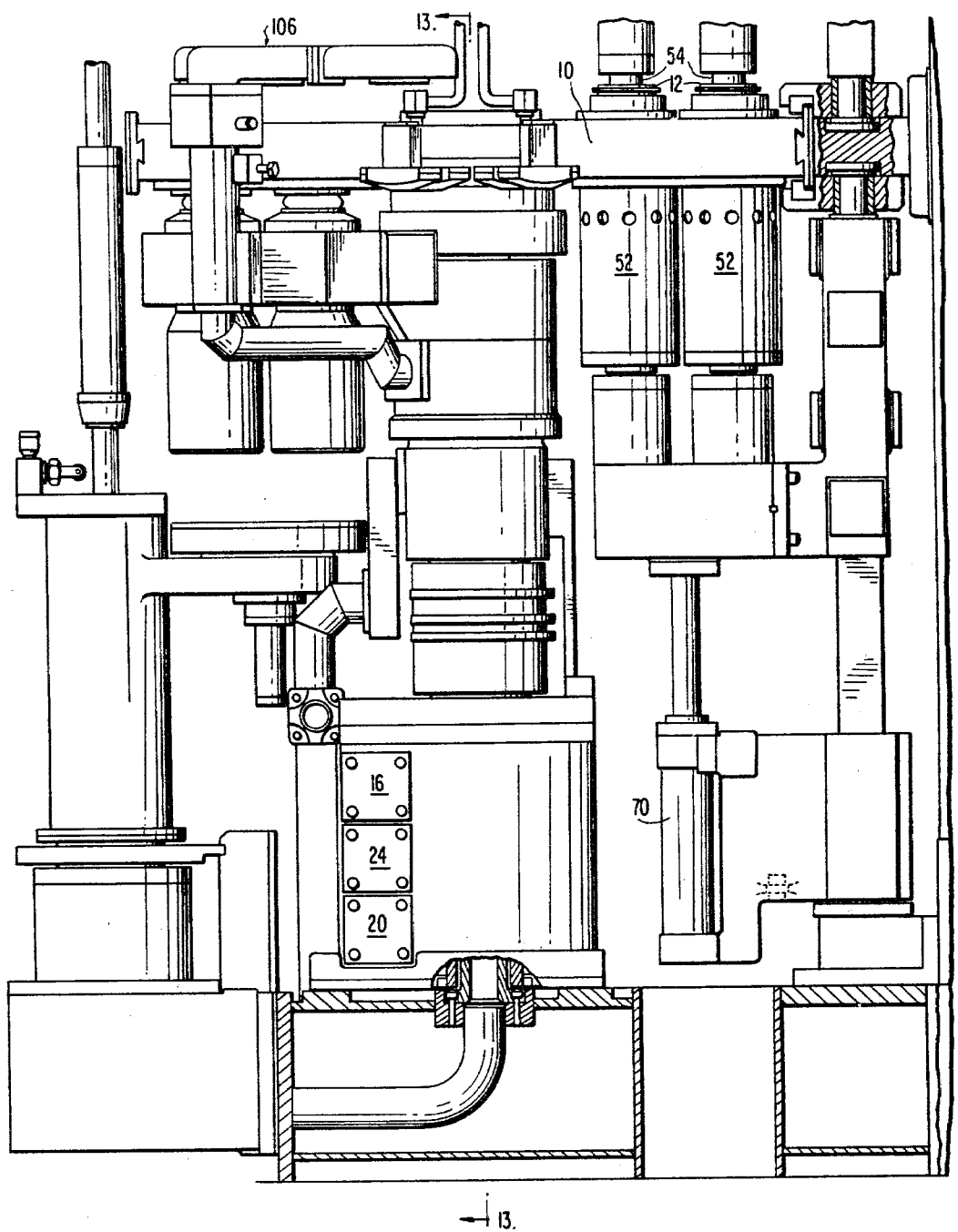
FIG. 9 is a side elevation partially in section and taken generally along the lines 9—9 of FIG. 1.

As shown in FIGS. 7A and 7B, the chutes 56 and the plungers 54 are mechanically interlocked with each other and moved simultaneously into and out of concentric alignment with the neck rings by means of piston 62 and hydraulic cylinder 64. The interlock between the two is a link 66 and as will be seen in FIGS. 7A and 7B, the chutes and plungers pivot around spaced parallel vertical axes.

Figure 2:
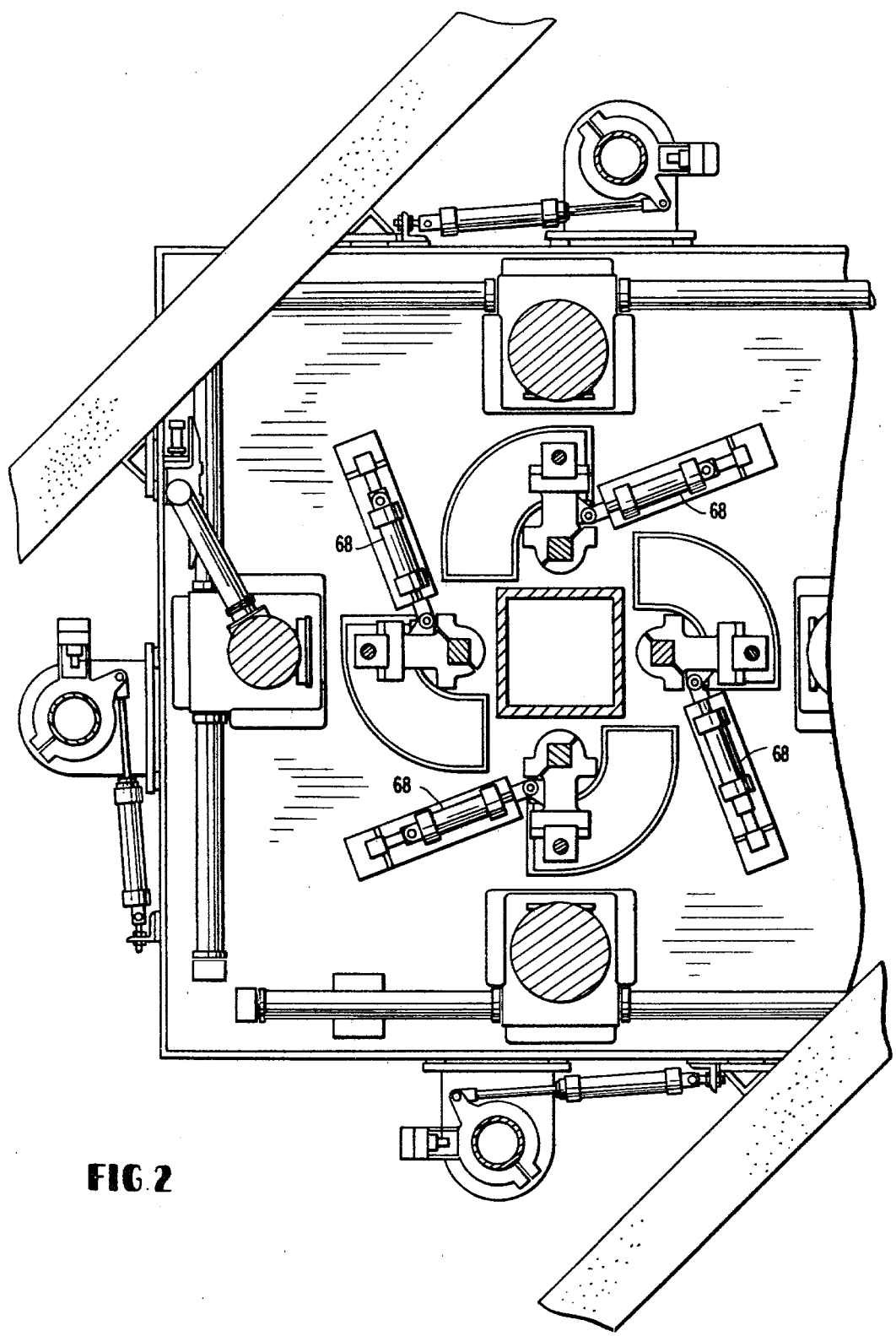
FIG. 2 is a view similar to FIG. 1 but taken at a level below the level of FIG. 1 on the line 2—2 of FIG. 9.

Pivotal movement of the parison mold supporting assembly 67 (shown in FIG. 9) is effected by further hydraulic cylinder and piston assemblies 68 as shown in FIG. 2.

Figure 10:
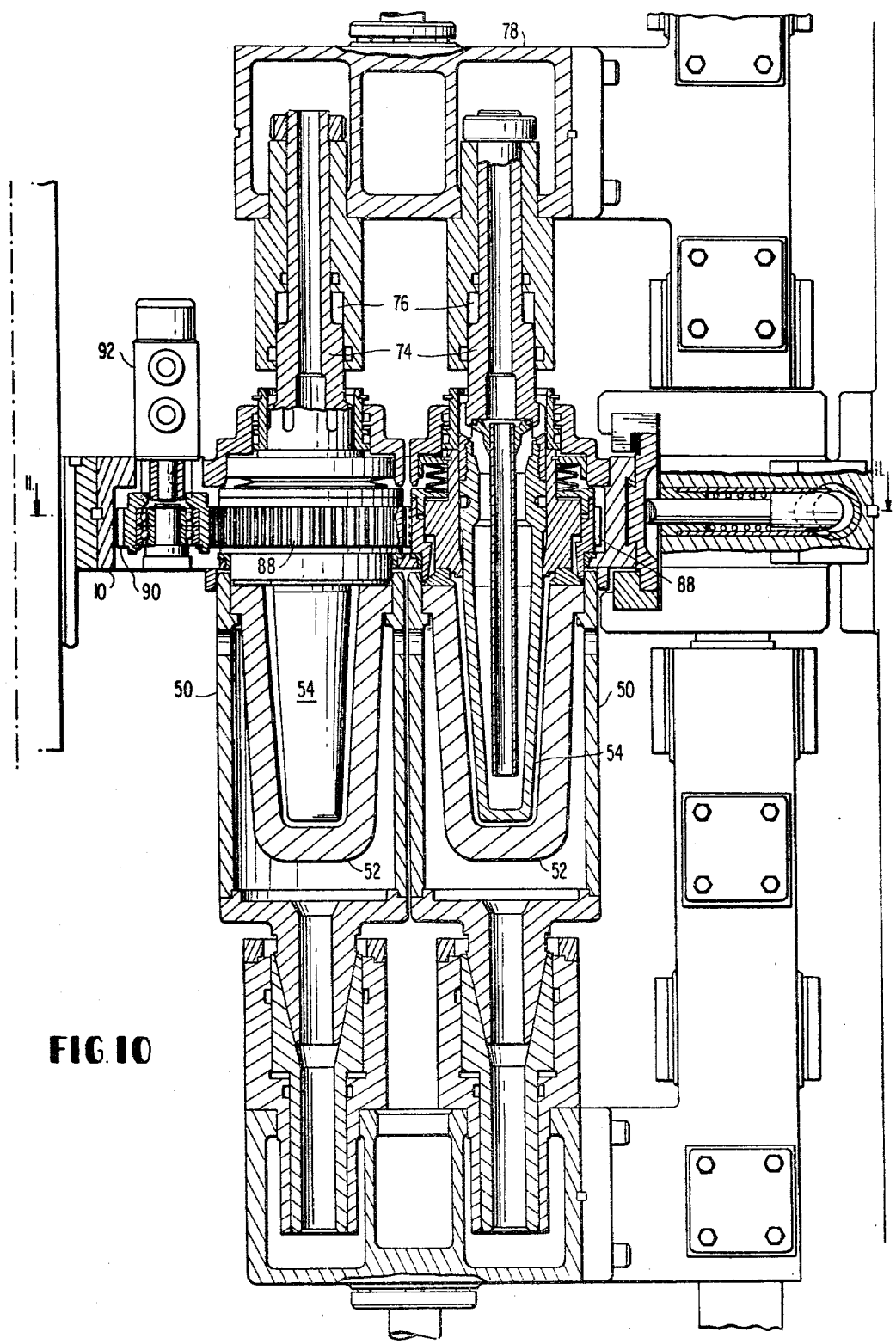
FIG. 10 is a side elevation partially in section showing the parison molds and plungers in molding position with respect to a locked position of the neck ring arm.

The operation of the apparatus to provide a preform will be understood from the following when considering FIGS. 2–9, inclusive: With the neck ring arm 10 locked in the position indicated in FIG. 6, the parison molds 50 together with their supporting assembly 67 are pivoted by means of the hydraulic cylinder and piston assemblies 68 into concentric alignment with the neck rings 12 on the right-hand side of the neck ring arm 10 as shown in FIG. 6. The parison molds 50 are then elevated by means of a further hydraulic cylinder and piston assembly 70 into rigid engagement with the underside of the neck rings. At the same time, the chutes 56 are positioned in vertical concentric alignment above the neck rings by means of the hydraulic cylinders 64 as shown in FIG. 7A. Molten glass from a feeder operating in timed relation to the other parts of the machine is then fed down the chutes 56, through the neck rings and into the bottom of the parison molds. The chutes are then pivoted out of the way and the plungers 54 are simultaneously moved into concentric alignment with the parison molds and neck rings and the plungers are then lowered through the neck rings and into the parison molds by means of hydraulic cylinder 72 shown in FIG. 6. This extrudes the molten glass upwardly through the annular space between the inner surface of the parison molds and the outer surface of the plungers and into position to be held by the neck rings and supported thereby as shown in FIG. 10. Following the forming step, the plungers are withdrawn and the parison molds lowered and then pivoted out of the way. The preforms are then ready to be enclosed by the two piece blow molds where they will be finally shaped and cooled.

Figures 11, 11A, 19, 20:
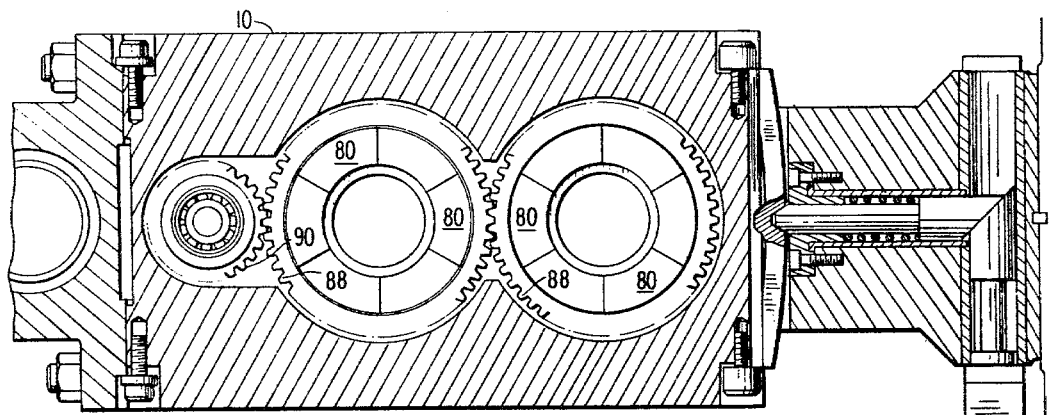
FIG. 11 is a sectional view on the lines 11—11 of FIG. 10.
FIG. 11A is similar to FIG. 11 but with the locking means for the neck ring arm unlocked.
FIG. 19 is a top plan view of a spray cooling nozzle for the blow mold.
FIG. 20 is a side view partially in section of the spray cooling nozzles.
Figure 13:
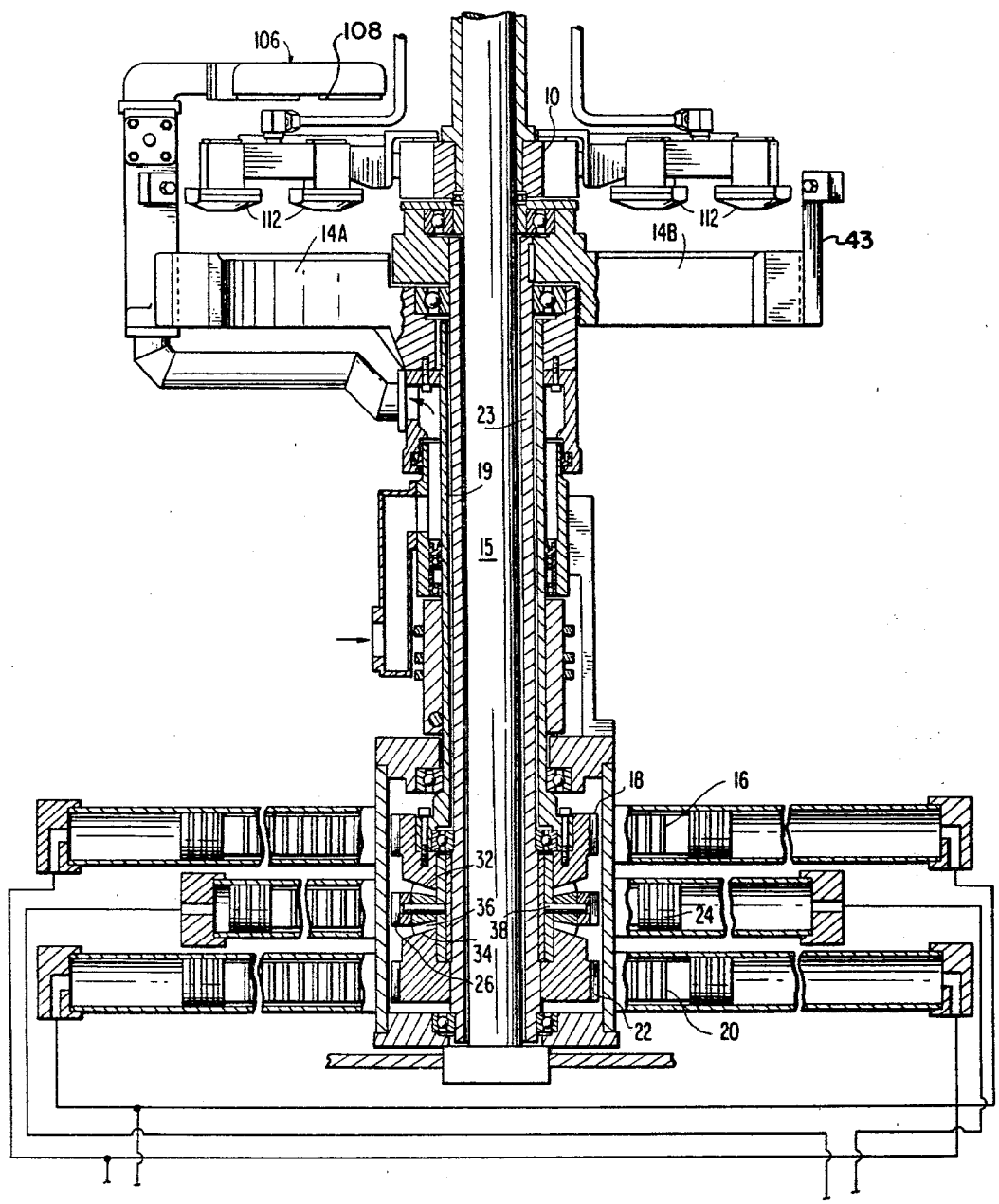
FIG. 13 is a side elevation partially in section on the line 13—13 of FIG. 9 showing the apparatus for opening and closing the blow molds and oscillating the neck ring arm between its two locked positions.
Figure 13A:
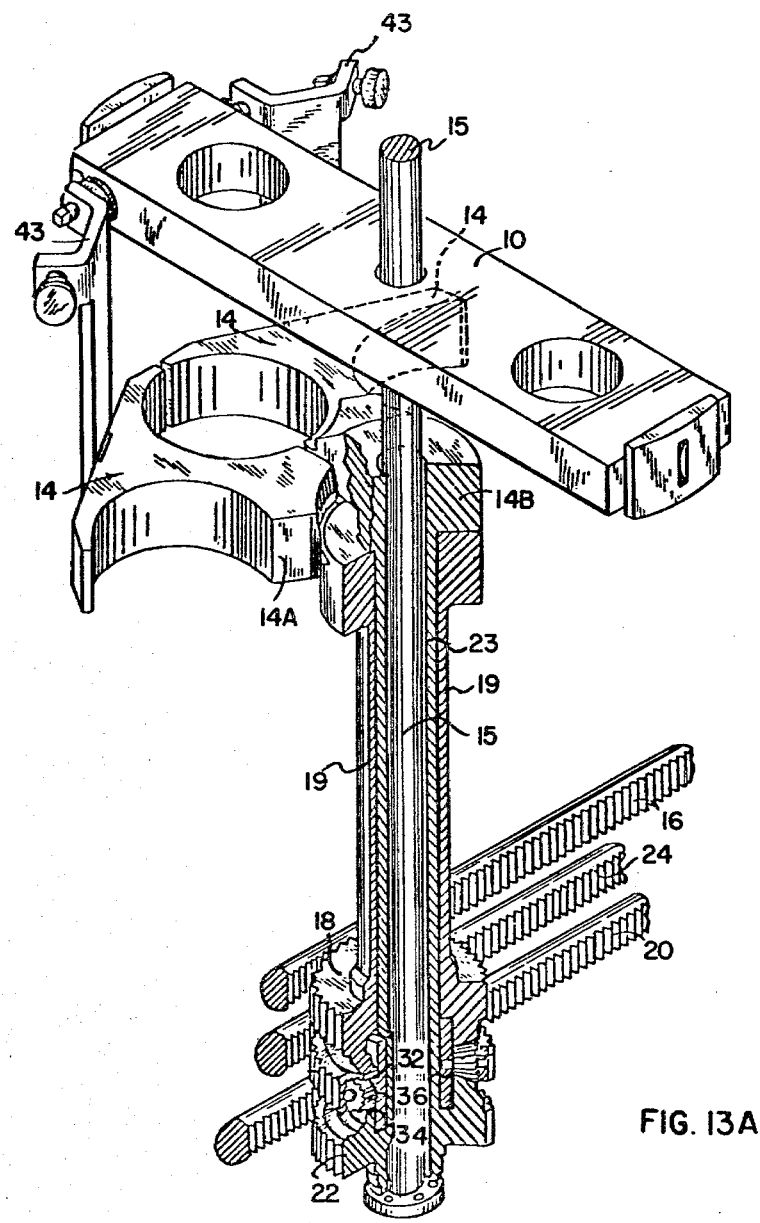
FIG. 13A is an isometric view of portions of the apparatus shown in FIG. 13.
Figure 15:
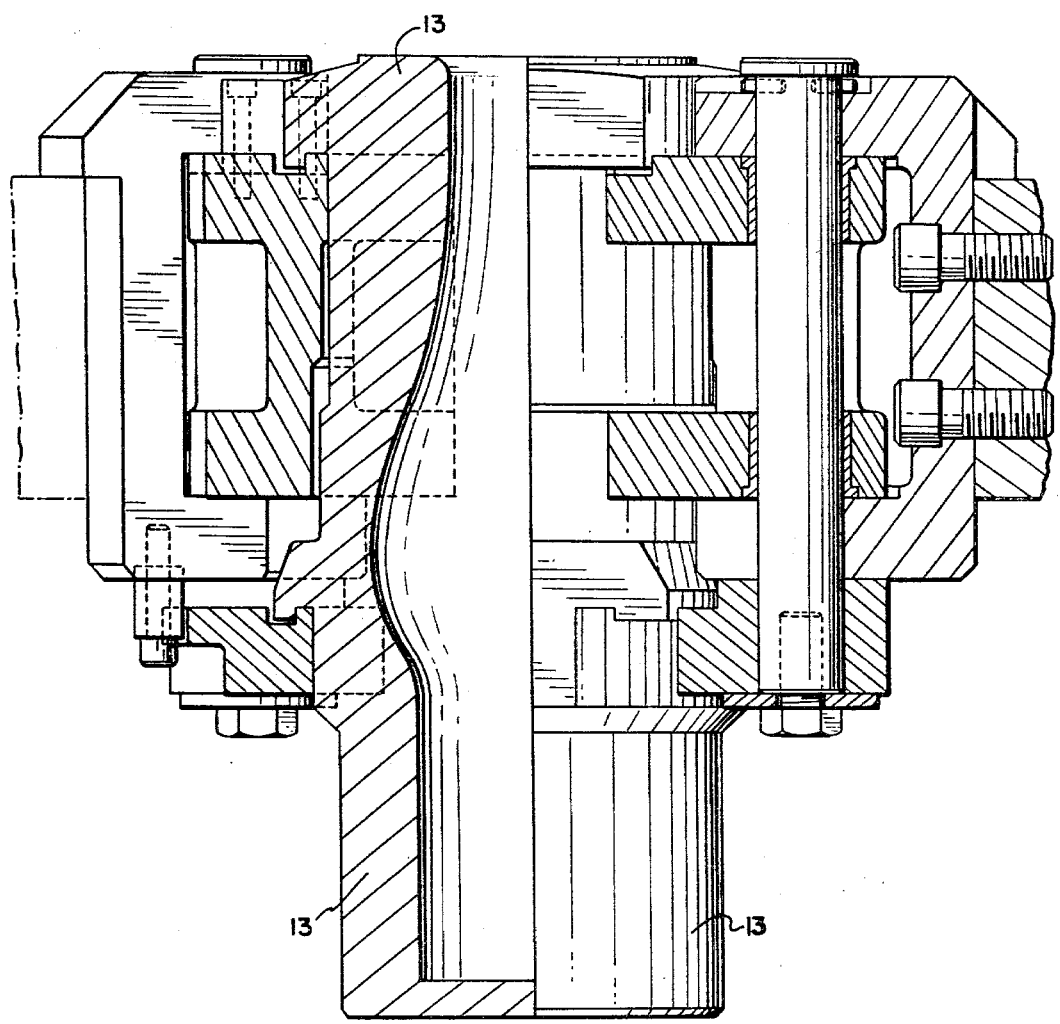
FIG. 15 is a side elevation partially in section taken on the line 15—15 of FIG. 14.

In order to compensate for variations in the size of the glass gobs delivered to the parison molds, as shown in FIGS. 10 and 11 the two plungers 54 which are forced downwardly into the parison molds by means of the single hydraulic cylinder 72, the pistons 74 extending vertically upwardly from said plungers and into chamber 75 between piston 74 and cylinders 76. The cylinders 76 are supplied independently in a suitable manner with a regulated hydraulic fluid pressure for each plunger providing independent glass pressing pressure so that the two plungers move into the molds with a pressure balancing effect. As shown in FIG. 10, each piston 74 is hollow and communicates with a manifold 78 so that cooling air can be circulated to the interior of the plunger through a downwardly extending tube 73.

C. Neck Ring Assembly

The rotatable neck ring assembly is best illustrated in FIGS. 10, 11, 12A and 12B. Each neck ring assembly is formed of an annular bushing 80 and a plurality of pivoted foot segments 82, each carried at the lower extremity of a stem 82'. These segments are biased toward neck ring open position as shown in FIG. 12B by means of coil springs 84. Each neck assembly ring further includes a sleeve 86 having an external ring gear 88 formed in its periphery and mating with a pinion gear 90 driven by a hydraulic motor 92 as shown in FIG. 10. As shown most clearly in FIGS. 10 and 11, the external ring gears 88 of the adjacent neck rings are in mesh with other so that both are driven by a single motor 92 shown in FIG. 10. Each pivoted foot segment 82 includes an inclined surface 94 tapered at about a 45° angle which mates with a correspondingly tapered but slightly rounded surface 96. The stems 82' are pivotally carried in individual counterbores 98' of a cylindrical sleeve 98 which also carries the bushing 80. The stems 82' each have a pivot pin 83 housed in square slots 83' in said cylindrical sleeve. A further cylindrical sleeve 100 acts as the piston of a hydraulic motor and when activated, is operative to permit the neck ring to open and release the ware.

When a parison mold 50 is elevated into engagement with the underside of a neck ring 12, it forces the pivoted foot segments 82 into the parison holding position shown in FIG. 12A. There will be a substantial frictional force between the surfaces 94 and 96 which has to be overcome by the very large force applied to elevate the blank parison molds into operative position. This force is sufficient to overcome the frictional force between the surfaces 94 and 96 and introduce a substantial hoop stress in that portion of the neck ring sleeve 86 surrounding the pivoted foot segments. This creates a substantial force tending to prevent opening of the neck ring after withdrawal of the parison molds and, in fact, the force is so great that it can only be overcome by the application of substantial hydraulic pressure through the fitting 102 which causes the sleeves 98 and 100 to move downwardly overcoming the frictional force between the surfaces 94 and 96 and the force of the springs 104 until the parts assume the position shown in FIG. 12B which then permits the pivoted foot segments to pivot radially outwardly under the force of the stem biasing spring 84 and release the molded ware. The spring 104 biases the parts to the closed neck ring position illustrated in FIG. 12A and the force of this spring must also be overcome by the downward movement of the sleeve 100 in order to permit the neck ring to open. Because of the extremely high forces which hold the pivoted foot segments in contact with each other, burning of the edges between adjacent foot segments which would otherwise be caused by the entry of molten glass therebetween, is substantially overcome and the life of the neck rings is much greater than in apparatus of the prior art.

D. Blow Molding and Blow Mold Cooling

Figure 1:
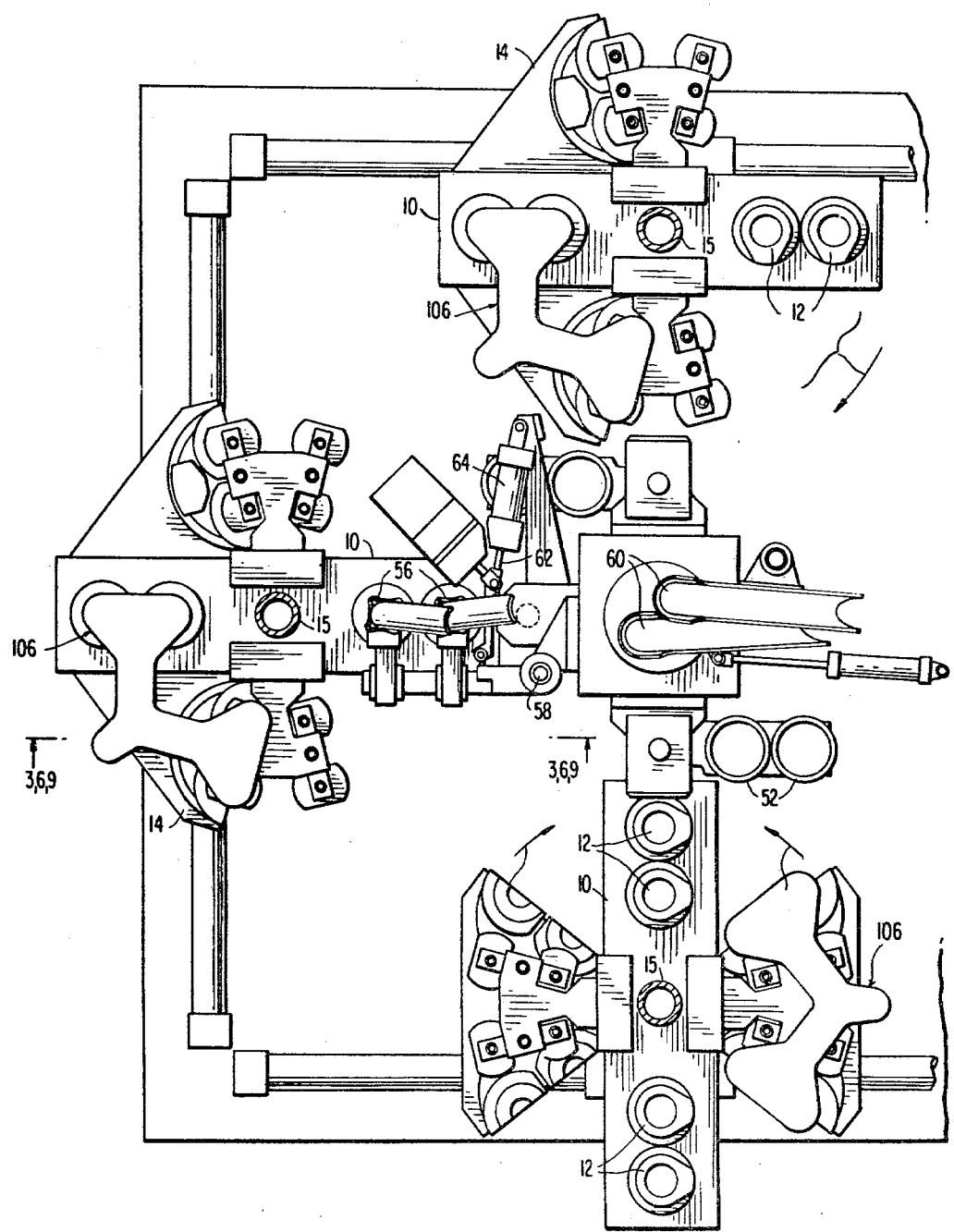
FIG. 1 is a partial top plan view showing three sections of a multiple section machine.

FIGS. 16, 17, and 18 show details of one of the blowing heads 106 carried by the blow mold support arms 14 as indicated in FIG. 1. Each blowing head 106 includes two pairs of nozzles 108, one of which is shown in cross-sectional view in FIG. 17. As also shown in FIG. 17, the nozzle exit 108' is spaced above the upper sleeve 100 of the neck ring assembly rather than being sealed thereto. This permits air exiting from the nozzle 108 to perform two functions simultaneously. First of all, the ware is shaped to the interior of the blow mold and at the same time, the ware is cooled because air is continuously exiting from the interior of the ware through the space between the blowing head 106 and the upper neck ring sleeve. This is extremely important to successful operation of the machine because it permits forming the ware with precisely controlled fluid back pressure and cooling of the ware in the mold to take place in a minimum of time and therefore permits the highest speed of operation of the machine.

A valve 110 routes air from a pressure source to one or the other pairs of nozzles 108, depending on the position of the mold carrier 14. The position of the valve 110 is shifted automatically depending upon which pair of molds is closed. This is perhaps best illustrated by FIG. 21A. In this Figure, the left-hand blow molds are closed, the valve 110 is positioned to the right as shown in FIGS. 16 and 18 and accordingly, air from the pressure source flows only in the left passageway 111 of FIG. 16 to the nozzles at the left end of the mold carrier. When the molds at the opposite end of the mold carrier are closed, the reverse is true.

The neck ring arm 10 also carries the spray cooling nozzles 112 which effect cooling of the opened blow molds 13 during the preforming blowing cycle as well as during oscillation of the neck ring arm between its two locked positions. As indicated in FIGS. 21A and 21B, there are four spray cooling nozzles 112 on each side of the neck ring arm. They are rigidly attached to the arm and positioned to direct a cooling liquid spray into the open blow molds whenever the blow mold carriers are fixed with respect to the arm which, generally speaking is during and after rotation of the arm, for example, from the position of FIG. 21C to the position of FIG. 21E. FIGS. 19 and 20 are top plan and side elevation partially in section views respectively of the nozzle head 42. Assuming the position of the blow mold carriers 14 shown in FIG. 21C, the blow mold at the right-hand end of the arm is closed and the other pair of blow molds is open having just discharged the finished ware from the opposite end of the neck ring arm and the closed blow molds have just closed around new preforms at the right-hand end of the arm. At this point, the four farthest right-hand spray nozzles 112 would be activated in order to spray cool both open pairs of blow mold halves preparatory to closing them around the next preform. This spraying can continue as the neck ring arm 10 rotates from FIG. 21C to FIG. 21D to FIG. 21E and would be terminated at about the time that the blow molds now on the left-hand end of the neck ring arm begin to open to release their ware.

Referring now to FIGS. 22A and 22B, this of course is intended to be a single figure, but being too long to compress on one sheet, 22B is merely a continuation of 22A. A time scale in seconds is indicated across the uppermost line of the diagram. Row I shows the complete sequence of operations performed on the glass while Rows II–X are intended to illustrate the overlap of the sequences between the two sets of molds which we can designate X and Z. Starting with Row II, the chutes 56 initiate their positioning under the gob delivery at 6 and $\frac{5}{8}$ seconds and receives the gob at zero which corresponds to the 7.5 seconds line of the previous cycle. The gob is delivered into the parison mold at $\frac{7}{8}$ of a second into the cycle. The chutes 56 will immediately retract from their feed position and will be out of the way by 1-2/8 seconds. Horizontal Row III shows that the parison mold receives the gob around $\frac{7}{8}$ of a second. It requires some time to remove the deflectors and position the pressing plunger above the preforming station so that the plunger can start to press the glass at about $1\frac{5}{8}$ seconds and finish at about $2\frac{1}{8}$ seconds. It will be understood that the blank parison mold had to go through a sequence of previous and past operations. Going now to horizontal line Row IV to show the sequence from the standpoint of the pressing plunger, again notice must be taken of the previous operations on the time scale. Referring back to Row I, the reheat cycle starts with the withdrawal of the parison mold and the pressing plunger at around $2\frac{1}{8}$ seconds and lasts until 5-4/8 seconds when the blowing head supplies air to the blow mold as indicated in Row V. The blow molds were closed a little earlier at about 5 seconds elapsed time as shown in Row V. The final blowing of the ware in the blow mold was started at 5 4/8 seconds and ended at the 5-second mark of the next cycle giving a total blowing time of 7 seconds as shown in Row V. During the final blowing, the neck ring arm is transferred 180° and this takes place between the 6-6/8 line to the 4/8 line of the next cycle. The rotation of the neck ring arm could not have been started earlier because the preform had not been completely blown out and was still soft enough to be deformed due to the high inertia forces associated with movement of the arm. The rotation must end a little before the parison mold rises into engagement with the neck ring for the next cycle. The parison mold rising signal at ROW III starts at about 2/8 seconds which is a little earlier than the time the neck ring arm finished its rotation. This is permissible, however, as the blank mold requires 0.2 to 0.3 seconds to be elevated into contact with the undersurface of the neck ring but it must be fully engaged with the neck ring an instant before the plunger begins its pressing cycle with starts at 1-4/8 seconds of the second cycle. Going now to horizontal Row VII, this shows that the rotation of the neck ring occurs between $6\frac{5}{8}$ seconds of one cycle to about 6-6/8 seconds of the next cycle. Actually, the rotation could start as early as 3 seconds or as soon as released from the preforming equipment. During the forming cycle, the paste of the Z mold was soaked from 2/8 seconds to $3\frac{7}{8}$ seconds as indicated in Row IX. The finished ware is released an instant before the rotation of the neck ring takes place, that is from 6 seconds to 6-4/8 seconds and the neck ring arm rotation starts at 6-6/8 seconds for the Z article (Row V).

The above described formation of one article which, for purposes of description we will call the X article, is outlined in dotted lines on the diagrams. By following the progress of the X article, and referring simultaneously to the other lines, those skilled in this art will understand exactly the overlap between the molding of the X and Z articles.

Due to the overlap in functions, a single preforming station can keep two blow molds busy at the same time. As described herein, there is a single preforming station having two parison molds and, consequently, there are four blow molds which are kept busy by the two parison molds. This has definite advantages in blow molding machines because, as will be noted from the diagram, there is substantially a full seven second time for blowing which is about 50% of the entire cycle whereas conventional machines of the prior art, at best, have about 30% of their cycle available for blow molding. Likewise, the mold cooling time which is substantially $3\frac{1}{2}$ seconds amounts to about 23% of the entire cycle which again is very advantageous compared with conventional machines of the prior art which hardly have 15% of their cycle time to spare for mold cooling.

Among other advantages of the present machine over those of the prior art are the ability to mold different articles in different sections of the machine so long as the size of the glass gobs required are the same. Also, the fact that the neck rings require so much force to open them permits the molding of much longer (and therefore heavier) articles than machines of the prior art. Still another advantage is the capability of operation either as a paste mold machine as described herein or as a hot mold machine. A paste mold machine is used for tumblers, lamp chimneys and the like, while a hot mold machine is generally used for thicker walled ware such as large containers. Different sections of the present machine can operate simultaneously in the paste and hot mold mode. In the so-called "MERRY-GO-ROUND" machines of the prior art, the parison molds are moving horizontally at the time they are being charged with molten glass. Since the time lapse after severing the gob until the gob hits the bottom of the parison mold can vary as much as 2/10 seconds depending on lubrication of the chutes, etc. the gob can even miss the parison mold completely. On the other hand, in the present machine, the neck ring arm is locked and the parison mold is moving only vertically in concentric alignment with its respective neck ring so that problems such as "brush marks" caused by the falling gob being loaded into a horizontally travelling parison mold are completely avoided. In the present machine, the articles are preformed and finish formed in the same spot in space as contrasted with the "MERRY-GO-ROUND" machines of the prior art. This permits the molding of longer articles as well as articles with heavier bottoms and articles made from high refractory glasses which exhibit a very narrow viscous temperature range. Molding articles using high refractory glasses in moving mold machines is not practical because of temperature differences in different parts of the mold caused by movement of the molds through the ambient air.

From the foregoing, it is believed that it will be apparent to those skilled in this art that there is herein shown and disclosed a new highly efficient blow molding machine which is capable of extremely high speed production as compared with other machines currently employed for this purpose. While a preferred embodiment has been herein shown and disclosed, applicant claims the benefit of a full range of equivalents within the scope of appended claims.

I claim:

1. A method of blow molding hollow glassware comprising:
   pressing a preform in a parison mold with a controlled pressure plunger and thereafter supporting said preform by a rotatable neck ring within a closed blow mold;
   positioning a nozzle in aligned but non-sealed spaced relation to said neck ring; and
   forming said preform into ware having the shape of said blow mold by forcing air through said nozzle into the interior of the ware while permitting air to exit from the ware through the space between said nozzle and said neck ring to simultaneously shape and internally cool the ware.

* * * * *